(12) United States Patent
Kim et al.

(10) Patent No.: US 9,383,826 B2
(45) Date of Patent: Jul. 5, 2016

(54) SYSTEM AND METHOD FOR RECOGNIZING USER'S GESTURE FOR CARRYING OUT OPERATION OF VEHICLE

(71) Applicant: Hyundai Motor Company, Seoul (KR)

(72) Inventors: Seona Kim, Seoul (KR); Dongsoo Shin, Gyeonggi-Do (KR); Jeong-Eom Lee, Yongin Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/523,491

(22) Filed: Oct. 24, 2014

(65) Prior Publication Data

US 2015/0160735 A1 Jun. 11, 2015

(30) Foreign Application Priority Data

Dec. 10, 2013 (KR) .................. 10-2013-0153472

(51) Int. Cl.
*G06F 3/033* (2013.01)
*G06F 3/01* (2006.01)
*G06K 9/46* (2006.01)
*G06K 9/00* (2006.01)

(52) U.S. Cl.
CPC ............ *G06F 3/017* (2013.01); *G06K 9/00355* (2013.01); *G06K 9/46* (2013.01); *G06K 2009/4666* (2013.01)

(58) Field of Classification Search
CPC ....... G06F 3/017; G06K 9/00355; G06K 9/46

USPC .......................................................... 345/156
See application file for complete search history.

(56) References Cited

U.S. PATENT DOCUMENTS

| 2012/0262381 | A1* | 10/2012 | Hirsch | ..................... G06F 3/017 345/173 |
| 2014/0177393 | A1* | 6/2014 | Menne | ................. B60Q 3/0293 367/89 |
| 2014/0204002 | A1* | 7/2014 | Bennet | ..................... G06F 3/011 345/8 |

FOREIGN PATENT DOCUMENTS

| JP | 2011-192090 A | 9/2011 |
| KR | 10-2012-0134488 A | 12/2012 |
| KR | 10-2013-0082216 A | 7/2013 |
| WO | 2006/050448 A1 | 5/2006 |
| WO | 2012/139241 A1 | 10/2012 |

* cited by examiner

*Primary Examiner* — Towfiq Elahi
(74) *Attorney, Agent, or Firm* — Mintz Levin Cohn Ferris Glovsky and Popeo, P.C.; Peter F. Corless

(57) ABSTRACT

A system for recognizing a user's gesture for carrying out an operation of a vehicle may include a camera installed within the vehicle to generate an object image, and a gesture recognizer that detects a user's hand from the object image, sets a region of interest (ROI) with reference to the user's hand, and recognizes the user's gesture by tracking the user's hand only within the ROI, where the ROI is varied depending on a moving direction and a moving speed of the user's hand.

13 Claims, 6 Drawing Sheets

SYSTEM AND METHOD FOR RECOGNIZING USER'S GESTURE FOR CARRYING OUT OPERATION OF VEHICLE

CROSS-REFERENCE TO RELATED APPLICATION

This application claims under 35 U.S.C. §119(a) priority to and the benefit of Korean Patent Application No. 10-2013-0153472 filed in the Korean Intellectual Property Office on Dec. 10, 2013, the entire contents of which are incorporated herein by reference.

BACKGROUND (a) Field of the Invention

The present invention relates to a system and a method for recognizing a user's gesture for operating a vehicle or a vehicle component, and thus can carry out an operation of the vehicle.

(b) Description of the Related Art

In general, a camera-based gesture recognition technology is used in various fields such as operation of a vehicle, a smart TV, a game player, and a mobile phone.

A gesture recognition success rate and a gesture recognition speed are key factors in the camera-based gesture recognition technology.

FIG. 6 (RELATED ART) is a flowchart of a method for recognizing a user's gesture according to a related art.

Referring to FIG. 6, in the related art, an object image is obtained via a camera and a background of the object image is removed to detect a user's hand. After that, the user's hand is tracked to recognize a user's gesture.

In this case, a region of interest (ROI), in which the user's hand is tracked to recognize the user's gesture, is preset. The ROI is fixed as the entire object image in order to track the user's hand even if the user's hand moves fast.

In the event that the ROI is wide, it takes a long time to track the user's hand such that the gesture recognition success rate and the gesture recognition speed are deteriorated.

The user such as a driver must frequently move his hand so as to input his gesture when the gesture recognition success rate is low, and thus an accident may occur as the driver's concentration is distracted.

The above information disclosed in this Background section is only for enhancement of understanding of the background of the invention and therefore it may contain information that does not form the prior art that is already known in this country to a person of ordinary skill in the art.

SUMMARY

The present invention provides a system and a method for recognizing a user's gesture for carrying out an operation of a vehicle having advantages of improving a gesture recognition success rate and a gesture recognition speed by setting a region of interest depending on a moving direction and a moving speed of a user's hand.

A system for recognizing a user's gesture for carrying out an operation of a vehicle according to an exemplary embodiment of the present invention may include: a camera, which is installed within the vehicle, and is configured to generate an object image; and a gesture recognizer configured to detect a user's hand from the object image, set a region of interest (ROI) with reference to the user's hand, and recognize the user's gesture by tracking the user's hand only within the ROI, wherein the ROI may be varied depending on a moving direction and a moving speed of the user's hand.

The gesture recognizer may include a preprocessing unit configured to perform preprocessing for removing a background and noise of the object image, and an ROI setting unit configured to detect the user's hand from the preprocessed object image using a plurality of feature points and set the ROI with reference to the user's hand.

The plurality of feature points may include fingertips, finger valleys, a wrist, and a center point of the user's hand, and the ROI setting unit may extract the fingertips, the finger valleys, and the wrist based on a curvature of an outline of the user's hand.

The ROI setting unit may detect a position of the user's hand according to predetermined pixel coordinates.

The ROI setting unit may set the ROI as a first region, which is formed with reference to the user's hand, when the moving speed of the user's hand is less than a predetermined speed.

The ROI setting unit may reset the ROI as a second region when the moving speed of the user's hand is greater than or equal to the predetermined speed after the ROI is set as the first region.

A size of the second region may be smaller than a size of the first region, and the second region may be expanded in the moving direction of the user's hand and reduced in a direction that is perpendicular to the moving direction of the user's hand based on the first region.

The ROI setting unit may restore the ROI to the first region when the moving speed of the user's hand is less than the predetermined speed after the ROI is reset as the second region.

The gesture recognizer may further include a storage unit configured to store gesture information matched with a plurality of application functions provided in the vehicle, and a matching unit configured to recognize the user's gesture and perform an application function that corresponds to the recognized user's gesture using the tracked user's hand and the gesture information stored in the storage unit.

The gesture information may include hand poses, which are set based on the plurality of feature points, and hand motions, which are set based on a position change of the plurality of feature points.

A method for recognizing a user's gesture for carrying out an operation of a vehicle according to an exemplary embodiment of the present invention may include: detecting a user's hand from an object image obtained via a camera; setting a region of interest (ROI) as a first region with reference to the user's hand; calculating a moving direction and a moving speed of the user's hand within the first region; and resetting the ROI as a second region when the moving speed of the user's hand is greater than or equal to a predetermined speed, wherein a size of the second region is smaller than a size of the first region, and the second region is expanded in the moving direction of the user's hand and reduced in a direction that is perpendicular to the moving direction of the user's hand based on the first region.

The detecting the user's hand may include: performing preprocessing for removing a background and noise of the object image; and detecting the user's hand from the preprocessed object image using a plurality of feature points.

The plurality of feature points may include fingertips, finger valleys, a wrist, and a center point of the user's hand, and the finger valleys, the wrist, and the center point of the user's hand may be extracted based on a curvature of an outline of the user's hand.

The method may further include restoring the ROI to the first region when the moving speed of the user's hand is less than the predetermined speed after the ROI is reset as the second region.

The method may further include: tracking the user's hand only within the ROI; and recognizing the user's gesture using the tracked user's hand and gesture information stored in a storage unit.

According to an exemplary embodiment of the present invention, the ROI may be varied depending on the moving direction and the moving speed of the user's hand such that the speed for tracking the user's hand may be improved.

Therefore, the gesture recognition success rate and the gesture recognition speed may be improved.

A non-transitory computer readable medium contains program instructions executed by a processor or controller, and may include: program instructions that detect a user's hand from an object image obtained via a camera; program instructions that set a region of interest (ROI) as a first region with reference to the user's hand; program instructions that calculate a moving direction and a moving speed of the user's hand within the first region; and program instructions that reset the ROI as a second region when the moving speed of the user's hand is greater than or equal to a predetermined speed, where a size of the second region is smaller than a size of the first region, and the second region is expanded in the moving direction of the user's hand and reduced in a direction that is perpendicular to the moving direction of the user's hand based on the first region.

DETAILED DESCRIPTION OF THE EMBODIMENTS

Figure 1:
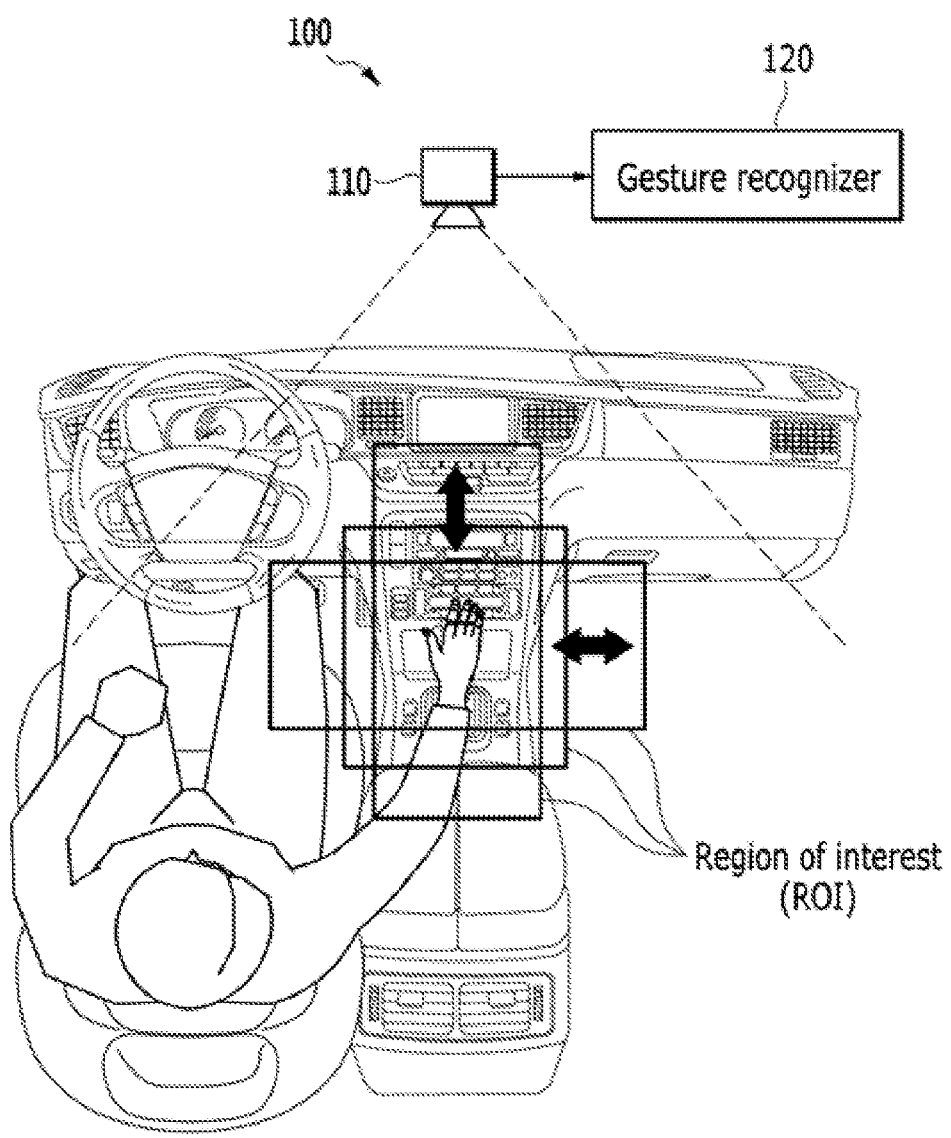
FIG. 1 is schematic drawing of a system for recognizing a user's gesture according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a system and method for recognizing a user's gesture according an exemplary embodiment of the present invention will be described in detail with reference to the accompanying drawings.

FIG. 1 is a schematic drawing of a system for recognizing a user's gesture according to an exemplary embodiment of the present invention.

As shown in FIG. 1, a system 100 for recognizing a user's gesture for carrying out an operation of a vehicle according to the exemplary embodiment of the present invention may include a camera 110 and a gesture recognizer 120.

The camera 110 is installed within the vehicle, and photographs a hand of a user such as a driver and a passenger to generate an object image. The object image is transmitted to the gesture recognizer 120.

The gesture recognizer 120 removes the background of the object image obtained via the camera 110 to detect the user's hand, sets a region of interest (ROI) with reference to the user's hand, and recognizes a user's gesture by tracking the user's hand only within the ROI. The ROI is a region in which the user's hand is tracked to recognize the user's gesture from the object image.

The gesture recognizer 120 may be implemented with one or more microprocessors executed by a predetermined program. The predetermined program may include a series of commands for performing each step included in a method for recognizing a user's gesture according to an exemplary embodiment of the present invention described below.

Figure 2:
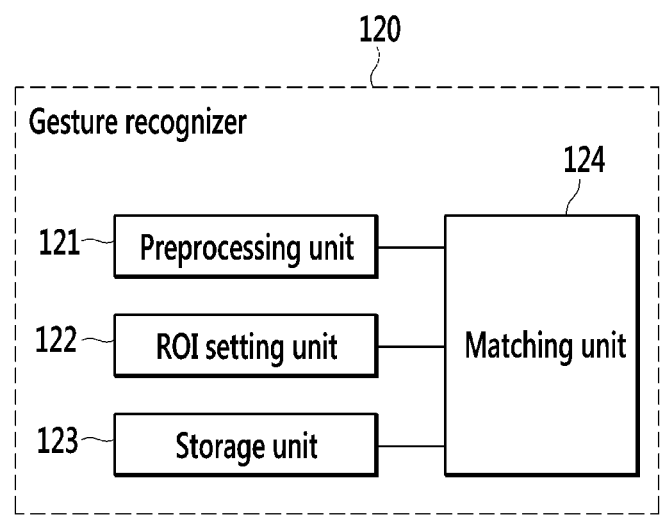
FIG. 2 is a block diagram of a gesture recognizer according to the exemplary embodiment of the present invention.

FIG. 2 is a block diagram of a gesture recognizer according to the exemplary embodiment of the present invention.

As shown in FIG. 2, the gesture recognizer 120 according to an exemplary embodiment of the present invention may include a preprocessing unit 121, an ROI setting unit 122, a storage unit 123, and a matching unit 124.

The preprocessing unit 121 performs preprocessing for removing the background and noise of the object image obtained via the camera 110.

The ROI setting unit 122 detects the user's hand from the preprocessed object image using a plurality of feature points, and sets the ROI with reference to the user's hand.

Figure 3:
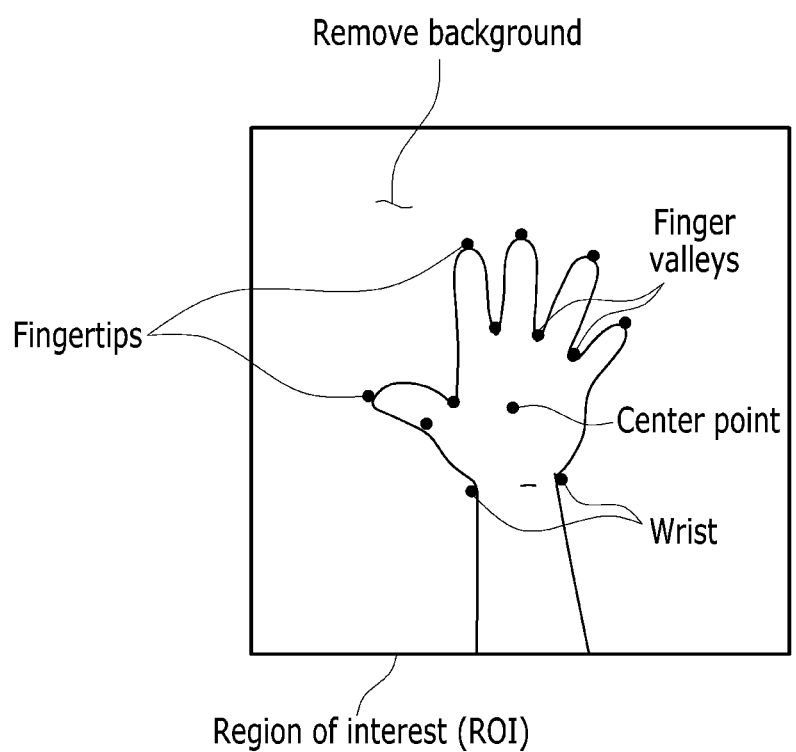
FIG. 3 is a schematic drawing for explaining a method for extracting a plurality of feature points from an object image according to the exemplary embodiment of the present invention.

FIG. 3 is a schematic drawing for explaining a method for extracting a plurality of feature points from an object image according to the exemplary embodiment of the present invention.

Referring to FIG. 3, the ROI setting unit 122 extracts the plurality of feature points from the object image and detects the user's hand through a hand modeling by using the plurality of feature points. The plurality of feature points may include fingertips, finger valleys, a wrist, and a center point of the user's hand. The ROI setting unit may extract the fingertips, the finger valleys, and the wrist based on a curvature of an outline of the user's hand.

The ROI setting unit 122 detects a position (coordinate) of the user's hand according to predetermined pixel coordinates. In this case, the position of the user's hand may be represented as two-dimensional coordinates [X, Y] or three-dimensional coordinates [X, Y, Z] according to performance of the camera 110.

The ROI setting unit 122 sets the ROI with reference to the user's hand, and tracks the user's hand only within the ROI instead of the entire object image. Therefore, the gesture recognition speed can be significantly improved.

Figure 4:
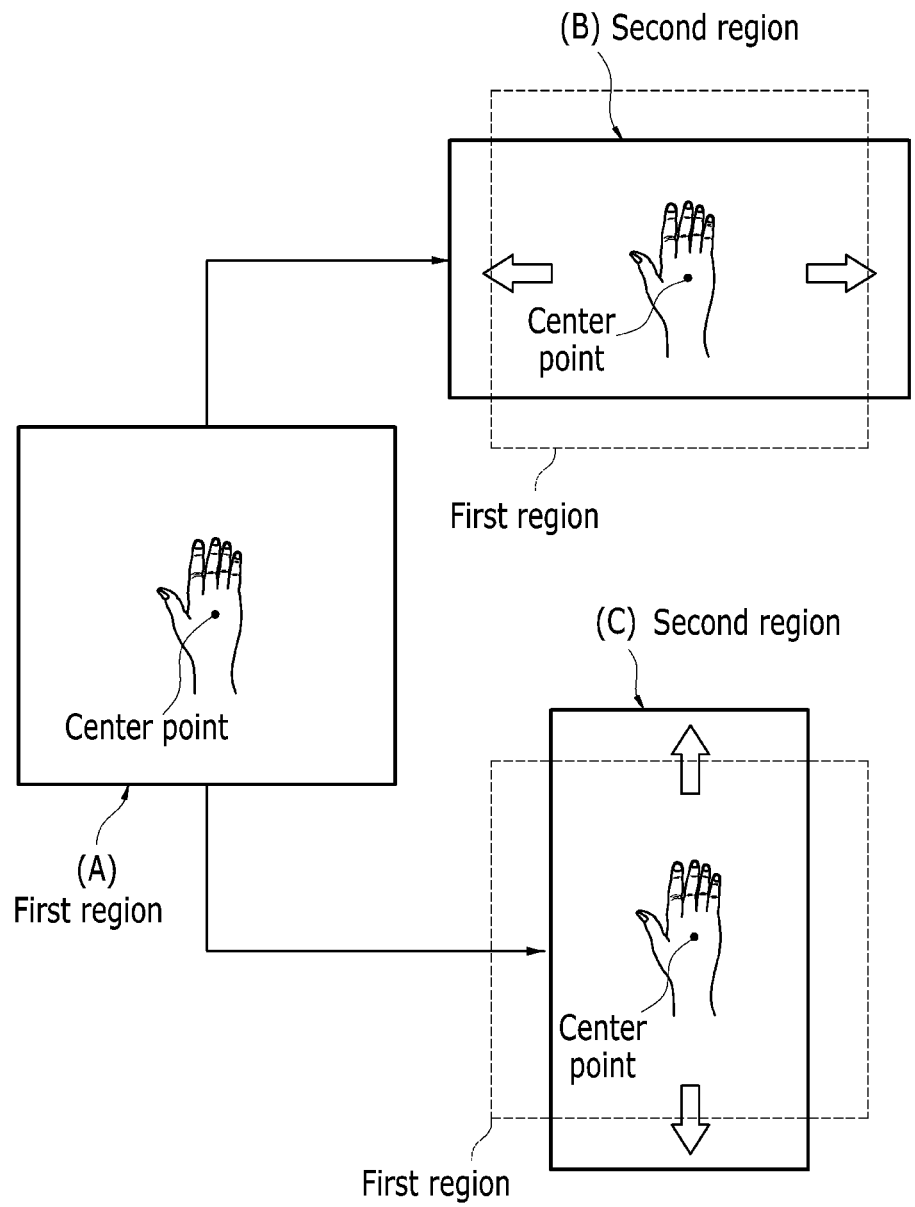
FIG. 4 is a schematic drawing for explaining a method of setting a region of interest according to an exemplary embodiment of the present invention.

FIG. 4 is a schematic drawing for explaining a method of setting a region of interest according to the exemplary embodiment of the present invention.

Referring to FIG. 4, the ROI setting unit 122 may calculate a moving direction and a moving speed of the user's hand using consecutive frames of the object image. Herein, the moving direction and the moving speed may be calculated based on the center point of the user's hand. In order to provide suitable reliability, the moving direction and the moving speed of the user's hand may be calculated at predetermined frame times (e.g., three frame times).

The ROI setting unit 122 sets the ROI as a first region when the moving speed of the user's hand is less than a predetermined speed. The first region may be formed in a square shape with reference to the user's hand, but is not limited thereto.

The ROI setting unit 122 resets the ROI as a second region when the moving speed of the user's hand is greater than or equal to the predetermined speed. The second region may be expanded in the moving direction of the user's hand and reduced in a direction that is perpendicular to the moving direction of the user's hand based on the first region. The second region is smaller than the first region.

In other words, when the user's hand rapidly moves in a specific direction, it is expected that the user's hand will continuously move in the specific direction. Accordingly, the ROI is expanded in the specific direction and reduced in a direction that is perpendicular to the specific direction such that a speed for tracking the user's hand may be improved.

For example, the second region may be formed in a rectangle shape having a width of 10 pixels and a height of 6 pixels when the user's hand moves to the left or the right by one pixel for one frame time, but the shape of the second region is not limited thereto.

The ROI setting unit 122 restores the ROI to the first region when the moving speed of the user's hand is less than the predetermined speed after the ROI is reset as the second region.

The storage unit 123 stores gesture information matched with a plurality of application functions provided in the vehicle. The plurality of application functions may be various application functions (e.g., power on/off, volume up/down, answering/turning off a mobile phone, play/stop/mute of music, etc.) of a plurality of electronic devices (e.g., an audio video navigation device, an air conditioner, etc.) provided in the vehicle.

The storage unit 123 may store the gesture information including hand poses and hand motions. The hand poses may be set based on the plurality of feature points, and the hand motions may be set based on a position change of the plurality of feature points.

The matching unit 124 recognizes the user's gesture using the tracked user's hand and the gesture information stored in the storage unit 123.

The matching unit 124 performs an application function that corresponds to the recognized user's gesture. For this purpose, the matching unit 124 may be connected with the plurality of electronic devices.

The matching unit 124 may display a gesture input state and an operation state for each application function via the audio video navigation device.

Hereinafter, referring to FIG. 5, a method for recognizing a user's gesture according to the exemplary embodiment of the present invention will be described in detail.

Figure 5:
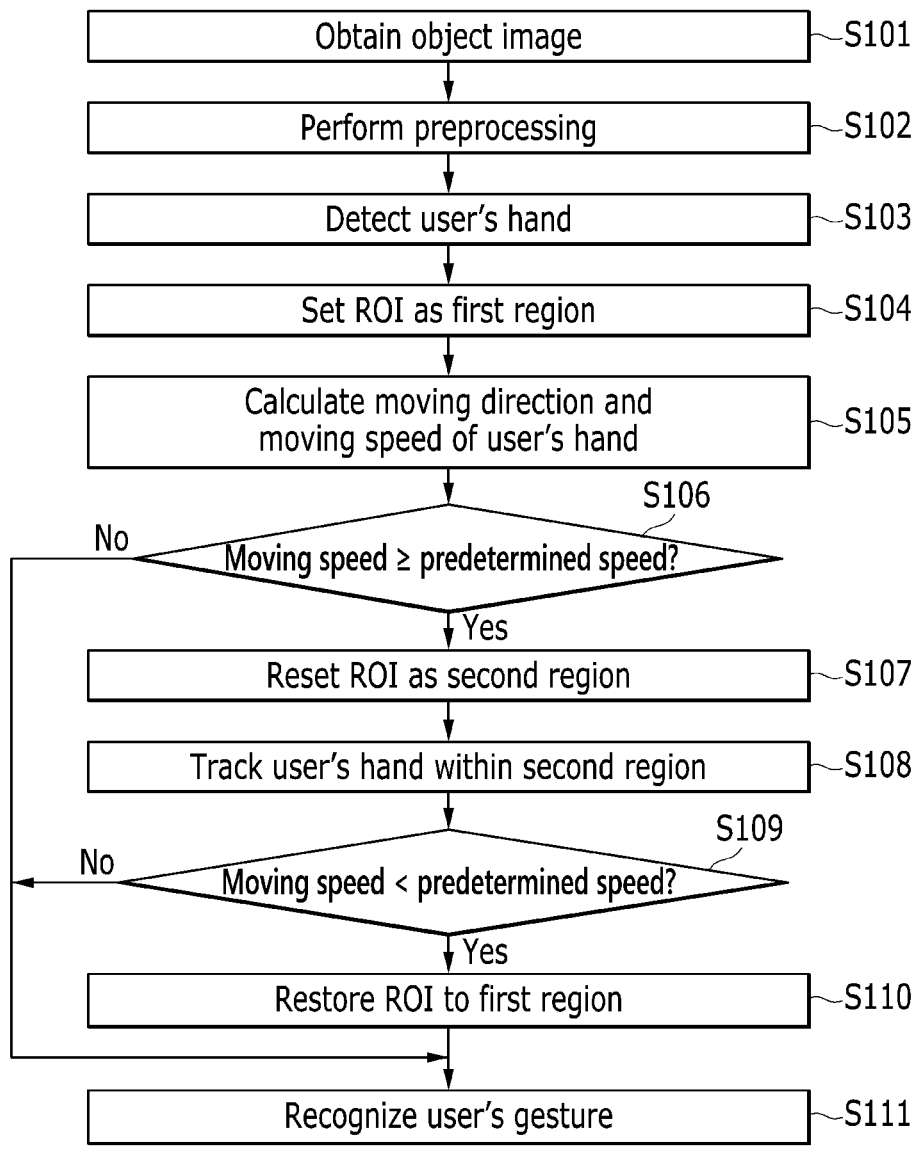
FIG. 5 is a flowchart of a method for recognizing a user's gesture according to the exemplary embodiment of the present invention.
Figure 6:
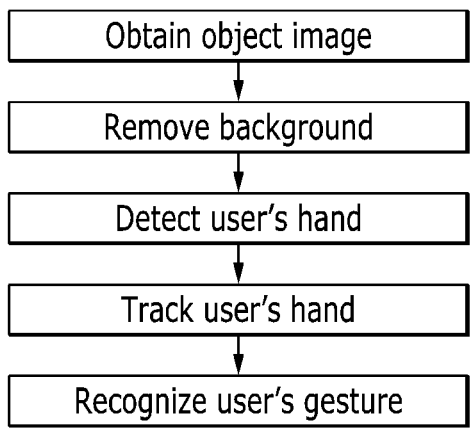
FIG. 6 (RELATED ART) is a flowchart of a method for recognizing a user's gesture according to a related art.

FIG. 5 is a flowchart of a method for recognizing a user's gesture according to the exemplary embodiment of the present invention.

As shown in FIG. 5, the gesture recognizer 120 obtains the object image from the camera 110 at step S101.

The gesture recognizer 120 performs preprocessing for removing the background and the noise of the object image at step S102.

The gesture recognizer 120 detects the user's hand from the preprocessed object image using the plurality of feature points at step S103. The plurality of feature points may include the fingertips, the finger valleys, the wrist, and the center point of the user's hand. The gesture recognizer 120 may extract the fingertips, the finger valleys, and the wrist based on the curvature of the outline of the user's hand.

The gesture recognizer 120 set the ROI as the first region at step S104. The first region may be formed in the square shape with reference to the user's hand, but is not limited thereto.

The gesture recognizer 120 calculates the moving direction and the moving speed of the user's hand within the first region at step S105.

The gesture recognizer 120 compares the moving speed of the user's hand with the predetermined speed at step S106.

When the moving speed of the user's hand is less than the predetermined speed at the step S106, the gesture recognizer 120 recognize the user's gesture only within the first region at step S111.

When the moving speed of the user's hand is greater than or equal to the predetermined speed at the step S106, the gesture recognizer 120 resets the ROI as the second region at step S107. The second region may be expanded in the moving direction of the user's hand and reduced in a direction that is perpendicular to the moving direction of the user's hand based on the first region. The second region is smaller than the first region.

The gesture recognizer 120 recognizes the user's gesture by tracking the user's hand only within the second region at step S108.

The gesture recognizer 120 compares the moving speed of the user's hand with the predetermined speed within the second region at step S109.

When the moving speed of the user's hand is greater than or equal to the predetermined speed at the S109, the gesture recognizer 120 recognize the user's gesture only within the second region at step S111.

When the moving speed of the user's hand is less than the predetermined speed at the S109, the gesture recognizer 120 restores the ROI to the first region at step S110.

The gesture recognizer 120 recognizes the user's gesture using the tracked user's hand and the gesture information stored in the storage unit 123 at step S111. The gesture recognizer 120 performs the application function that corresponds to the recognized user's gesture.

According to an exemplary embodiment of the present invention, the ROI may be varied depending on the moving direction and the moving speed of the user's hand such that the speed for tracking the user's hand may be improved.

Therefore, the gesture recognition success rate and the gesture recognition speed may be improved.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for recognizing a user's gesture for carrying out an operation of a vehicle, comprising:
    a camera, which is installed within the vehicle, and is configured to generate an object image; and
    a gesture recognizer configured to detect a user's hand from the object image, set a region of interest (ROI) with reference to the user's hand, and recognize the user's gesture by tracking the user's hand only within the ROI,
    wherein the ROI is varied depending on a moving direction and a moving speed of the user's hand wherein the gesture recognizer comprises an ROI setting unit configured set the ROI with reference to the user's hand,
    wherein the ROI setting unit sets the ROI as a first region, which is formed with reference to the user's hand, when the moving speed of the user's hand is less than a predetermined speed,
    wherein the ROI setting unit resets the ROI as a second region when the moving speed of the user's hand is greater than or equal to the predetermined speed after the ROI is set as the first region,
    a size of the second region is smaller than a size of the first region, and
    the second region is expanded in the moving direction of the user's hand and reduced in a direction that is perpendicular to the moving direction of the user's hand based on the area of the first region.

2. The system of claim 1, wherein the gesture recognizer further comprises
    a preprocessing unit configured to perform preprocessing for removing a background and noise of the object image; and
    the ROI setting unit detects the user's hand from the preprocessed object image using a plurality of feature points.

3. The system of claim 2, wherein
    the plurality of feature points comprise fingertips, finger valleys, a wrist, and a center point of the user's hand, and
    the ROI setting unit extracts the fingertips, the finger valleys, and the wrist based on a curvature of an outline of the user's hand.

4. The system of claim 2, wherein the ROI setting unit detects a position of the user's hand according to predetermined pixel coordinates.

5. The system of claim 1, wherein the ROI setting unit restores the ROI to the first region when the moving speed of the user's hand is less than the predetermined speed after the ROI is reset as the second region.

6. The system of claim 2, wherein the gesture recognizer further comprises:
    a storage unit configured to store gesture information matched with a plurality of application functions provided in the vehicle; and
    a matching unit configured to recognize the user's gesture and perform an application function that corresponds to the recognized user's gesture using the tracked user's hand and the gesture information stored in the storage unit.

7. The system of claim 6, wherein the gesture information comprises hand poses, which are set based on the plurality of feature points, and hand motions, which are set based on a position change of the plurality of feature points.

8. A method for recognizing a user's gesture for carrying out an operation of a vehicle, comprising:
    detecting a user's hand from an object image obtained via a camera;
    setting a region of interest (ROI) as a first region with reference to the user's hand;
    calculating a moving direction and a moving speed of the user's hand within the first region; and
    resetting the ROI as a second region when the moving speed of the user's hand is greater than or equal to a predetermined speed,
    wherein a size of the second region is smaller than a size of the first region, and the second region is expanded in the moving direction of the user's hand and reduced in a direction that is perpendicular to the moving direction of the user's hand based on the area of the first region.

9. The method of claim 8, wherein the detecting the user's hand comprises:
    performing preprocessing for removing a background and noise of the object image; and
    detecting the user's hand from the preprocessed object image using a plurality of feature points.

10. The method of claim 8, wherein
    the plurality of feature points comprise fingertips, finger valleys, a wrist, and a center point of the user's hand, and
    the fingertips, the finger valleys, the wrist, and the center point of the user's hand are extracted based on a curvature of an outline of the user's hand.

11. The method of claim 8, further comprising restoring the ROI to the first region when the moving speed of the user's hand is less than the predetermined speed after the ROI is reset as the second region.

12. The method of claim 8, further comprising:
    tracking the user's hand only within the ROI; and
    recognizing the user's gesture using the tracked user's hand and gesture information stored in a storage unit.

13. A non-transitory computer readable medium containing program instructions executed by a processor or controller, the computer readable medium comprising:
- program instructions that detect a user's hand from an object image obtained via a camera;
- program instructions that set a region of interest (ROI) as a first region with reference to the user's hand;
- program instructions that calculate a moving direction and a moving speed of the user's hand within the first region; and
- program instructions that reset the ROI as a second region when the moving speed of the user's hand is greater than or equal to a predetermined speed,
- wherein a size of the second region is smaller than a size of the first region, and the second region is expanded in the moving direction of the user's hand and reduced in a direction that is perpendicular to the moving direction of the user's hand based on the area of the first region.

* * * * *